(12) United States Patent
Kim et al.

(10) Patent No.: US 11,614,340 B2
(45) Date of Patent: Mar. 28, 2023

(54) VEHICLE DRIVING CONTROL APPARATUS AND CALIBRATION METHOD PERFORMED BY THE VEHICLE DRIVING CONTROL APPARATUS

(71) Applicant: Samsung Electronics Co., Ltd., Suwon-si (KR)

(72) Inventors: Yuna Kim, Suwon-si (KR); Byoungoh Kim, Suwon-si (KR); Keunjik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 16/720,704

(22) Filed: Dec. 19, 2019

(65) Prior Publication Data
US 2020/0200566 A1    Jun. 25, 2020

(30) Foreign Application Priority Data
Dec. 20, 2018    (KR) .................. 10-2018-0166409

(51) Int. Cl.
*G01C 25/00*    (2006.01)
*G06K 9/62*    (2022.01)
(Continued)

(52) U.S. Cl.
CPC ....... *G01C 25/005* (2013.01); *G01C 21/3617* (2013.01); *G01C 21/3641* (2013.01);
(Continued)

(58) Field of Classification Search
CPC .. G06K 9/6289; G06Q 10/047; G01C 25/005; G01C 21/32; G01C 21/3617; G01C 21/3641; G01C 21/3848; G01C 21/3819
See application file for complete search history.

(56) References Cited

U.S. PATENT DOCUMENTS 6,778,928 B2 *  8/2004  Stiller .................. G01S 13/931
                                               702/104
9,201,424 B1 * 12/2015  Ogale ....................... G06T 7/80
(Continued)

FOREIGN PATENT DOCUMENTS

JP       2002-286455 A    10/2002
WO     WO-2016130719 A2 *  8/2016  ............ B60W 30/10

OTHER PUBLICATIONS

European Search Report dated Sep. 21, 2021, issued in European Application No. 19899915.3.
(Continued)

*Primary Examiner* — Luis A Martinez Borrero
(74) *Attorney, Agent, or Firm* — Jefferson IP Law, LLP

(57) ABSTRACT

A vehicle driving control apparatus for controlling driving of a vehicle based on information received from a plurality of sensors, and a calibration method performed thereby is provided. The vehicle driving control apparatus includes at least one processor configured to determine a driving route to include a predetermined area of road, upon determining that calibration of a first sensor is required, and a memory configured to store values measured by the plurality of sensors while the vehicle is being driven along the driving route, wherein the at least one processor is further configured to calibrate the first sensor based on the stored measured values and information about the predetermined area of road.

24 Claims, 13 Drawing Sheets

(51) Int. Cl.
*G06Q 10/04* (2012.01)
*G01C 21/36* (2006.01)
*G01C 21/00* (2006.01)
*G06Q 10/047* (2023.01)

(52) U.S. Cl.
CPC ..... *G01C 21/3819* (2020.08); *G01C 21/3848* (2020.08); *G06K 9/6289* (2013.01); *G06Q 10/047* (2013.01)

(56) References Cited

U.S. PATENT DOCUMENTS

| | | | |
|---|---|---|---|
| 9,275,458 B2 * | 3/2016 | Oh | G06T 7/80 |
| 9,719,801 B1 | 8/2017 | Ferguson et al. | |
| 10,119,827 B2 * | 11/2018 | Rander | G01C 21/3453 |
| 10,339,389 B2 * | 7/2019 | Xu | G06T 7/73 |
| 10,989,562 B2 * | 4/2021 | Ozog | G01S 7/52004 |
| 2006/0047381 A1 * | 3/2006 | Nguyen | H04L 43/50 |
| | | | 701/2 |
| 2009/0290032 A1 * | 11/2009 | Zhang | B60R 1/00 |
| | | | 348/211.9 |
| 2012/0173185 A1 * | 7/2012 | Taylor | G01S 7/4004 |
| | | | 356/243.1 |
| 2014/0043473 A1 * | 2/2014 | Gupta | H04N 17/002 |
| | | | 348/135 |
| 2014/0240690 A1 * | 8/2014 | Newman | G01S 17/89 |
| | | | 356/4.01 |
| 2015/0266490 A1 | 9/2015 | Coelingh et al. | |
| 2016/0061627 A1 * | 3/2016 | Tan | G01C 25/00 |
| | | | 702/85 |
| 2016/0063330 A1 * | 3/2016 | Xu | B60R 1/00 |
| | | | 382/103 |
| 2016/0161602 A1 * | 6/2016 | Prokhorov | G01S 7/4972 |
| | | | 702/97 |
| 2017/0010618 A1 * | 1/2017 | Shashua | G06F 16/29 |
| 2017/0124781 A1 * | 5/2017 | Douillard | G01S 17/931 |
| 2017/0248426 A1 * | 8/2017 | Jesudason | G01C 25/00 |
| 2017/0343654 A1 * | 11/2017 | Valois | G01S 17/931 |
| 2018/0188037 A1 * | 7/2018 | Wheeler | G01C 21/3841 |
| 2019/0122386 A1 * | 4/2019 | Wheeler | G01S 17/42 |
| 2019/0376809 A1 * | 12/2019 | Hanniel | G01C 21/3819 |
| 2019/0384294 A1 * | 12/2019 | Shashua | G05D 1/0253 |
| 2020/0018618 A1 * | 1/2020 | Ozog | G01S 7/52004 |
| 2020/0226790 A1 * | 7/2020 | Alvarez | G01S 13/931 |
| 2020/0250807 A1 * | 8/2020 | Hong | G06T 7/0002 |
| 2021/0025725 A1 * | 1/2021 | Braunstein | G01C 21/30 |
| 2021/0072031 A1 * | 3/2021 | Gdalyahu | G01C 21/3647 |
| 2021/0276579 A1 * | 9/2021 | Mielenz | G01S 7/4972 |
| 2022/0011130 A1 * | 1/2022 | Hanniel | G01C 21/30 |

OTHER PUBLICATIONS

International Search Report and Written Opinion dated Mar. 27, 2020, Issued in International Application No. PCT/KR2019/018112.

* cited by examiner

VEHICLE DRIVING CONTROL APPARATUS AND CALIBRATION METHOD PERFORMED BY THE VEHICLE DRIVING CONTROL APPARATUS

CROSS-REFERENCE TO RELATED APPLICATION(S)

This application is based on and claims priority under 35 U.S.C. § 119(a) of a Korean patent application number 10-2018-0166409, filed on Dec. 20, 2018, in the Korean Intellectual Property Office, the disclosure of which is incorporated by reference herein in its entirety.

BACKGROUND

1. Field

The disclosure relates to a method, performed by a vehicle driving control apparatus, of calibrating a sensor based on information received from a plurality of sensors.

2. Description of Related Art

The convergence of information and communication technology and the automotive industry has made rapid progress in the smartification of vehicles. Vehicles are evolving from simple mechanical devices into smart cars due to such smartification. Smart cars are also called connected cars and may refer to vehicles capable of accessing a network and having a physical system for interconnecting a vehicle and an external network through wireless communication.

Driving control using sensors of a vehicle has been attracting much attention as a key technology of smart cars. Various sensors may be mounted in a smart car, and the smart car may be driven based on information received from the sensors, to provide convenience and safety to a user.

The above information is presented as background information only to assist with an understanding of the disclosure. No determination has been made, and no assertion is made, as to whether any of the above might be applicable as prior art with regard to the disclosure.

SUMMARY

To increase safety of an autonomous vehicle, sensor errors occurring as time passes need to be minimized by periodically calibrating various sensors used for autonomous driving.

Aspects of the disclosure are to address at least the above-mentioned problems and/or disadvantages and to provide at least the advantages described below. Accordingly, an aspect of the disclosure is to provide a method capable of increasing accuracy and efficiency of calibrating a plurality of sensors used for autonomous driving of a vehicle.

Additional aspects will be set forth in part in the description which follows and, in part, will be apparent from the description, or may be learned by practice of the presented embodiments.

In accordance with an aspect of the disclosure, a vehicle driving control apparatus for controlling driving of a vehicle based on information received from a plurality of sensors is provided. The vehicle driving control apparatus includes at least one processor configured to determine a driving route to include a predetermined area of road, upon determining that calibration of a first sensor is required, and a memory configured to store values measured by the plurality of sensors while the vehicle is being driven along the driving route, wherein the at least one processor is further configured to calibrate the first sensor based on the stored measured values and information about the predetermined area of road.

In accordance with another aspect of the disclosure, a calibration method performed by a vehicle driving control apparatus based on information received from a plurality of sensors is provided. The calibration method includes determining that calibration of a first sensor is required, determining a driving route to include a predetermined area of road, storing values measured by the plurality of sensors while a vehicle is being driven along the driving route, and calibrating the first sensor based on the stored measured values and information about the predetermined area of road.

In accordance with another aspect of the disclosure, a vehicle driving control apparatus for controlling driving of a vehicle based on information received from a plurality of sensors is provided. The vehicle driving control apparatus includes a communicator configured to transmit a signal indicating that calibration of a first sensor is required, and to receive a driving route determined to include a predetermined area of road, in response to the transmitted signal, a memory configured to store values measured by the plurality of sensors while the vehicle is being driven along the driving route, and at least one processor configured to calibrate the first sensor based on the stored measured values and information about the predetermined area of road.

In accordance with another aspect of the disclosure, a calibration method performed by a vehicle driving control apparatus based on information received from a plurality of sensors is provided. The calibration method includes transmitting a signal indicating that calibration of a first sensor is required, receiving a driving route determined to include a predetermined area of road, in response to the transmitted signal, storing values measured by the plurality of sensors while a vehicle is being driven along the driving route, and calibrating the first sensor based on the stored measured values and information about the predetermined area of road.

In accordance with another aspect of the disclosure, a navigation server for providing a driving route to a vehicle driving control apparatus is provided. The navigation server includes a communicator configured to receive, from the vehicle driving control apparatus, a signal indicating that calibration of a first sensor mounted in a vehicle is required, and at least one processor configured to determine a driving route to include a predetermined area of road used to calibrate the first sensor, based on map data including information about an area of road used to calibrate each of a plurality of sensors, wherein the communicator is further configured to transmit, to the vehicle driving control apparatus, the driving route and information about the predetermined area of road.

In accordance with another aspect of the disclosure, a method, performed by a navigation server, of providing a driving route to a vehicle driving control apparatus is provided. The method includes receiving, from the vehicle driving control apparatus, a signal indicating that calibration of a first sensor mounted in a vehicle is required, determining a driving route to include a predetermined area of road used to calibrate the first sensor, based on map data including information about an area of road used to calibrate each of a plurality of sensors, and transmitting, to the vehicle driving control apparatus, the driving route and information about the predetermined area of road.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
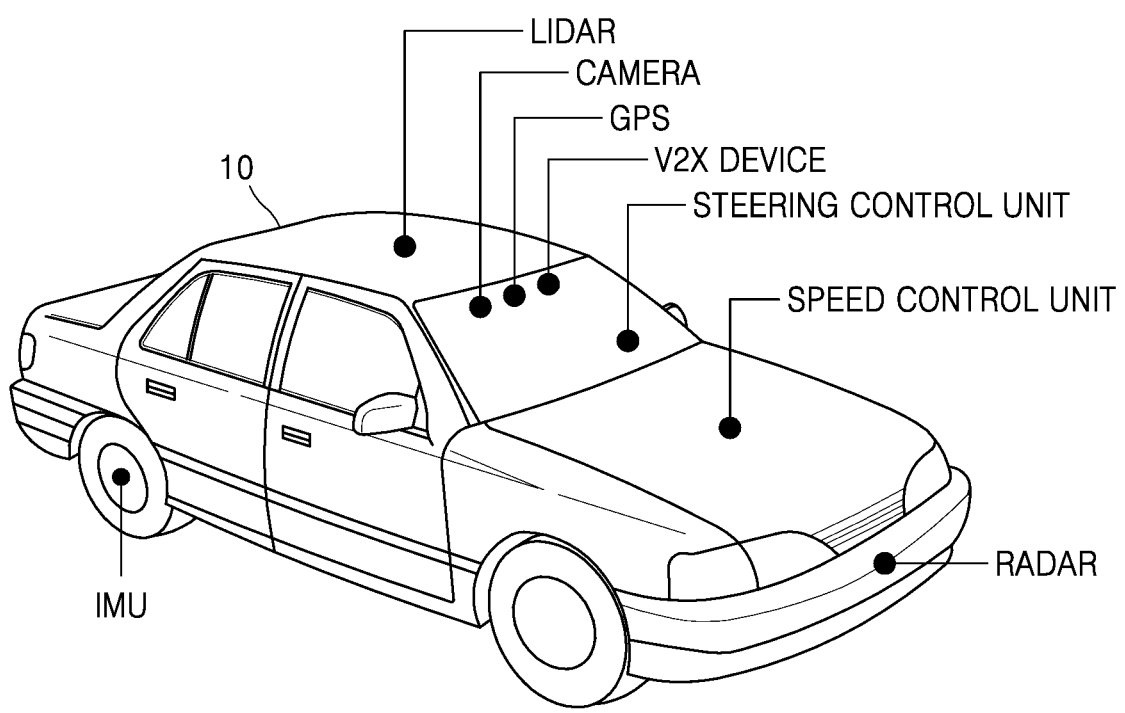
FIG. 1 is a diagram for describing an autonomous vehicle according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Some embodiments of the disclosure may be described in terms of functional blocks and various processing operations. Some or all of the functional blocks may be implemented by any number of hardware and/or software elements configured to perform certain functions. For example, the functional blocks of the disclosure may be implemented by one or more microprocessors or circuit elements for certain functions. As another example, the functional blocks of the disclosure may be implemented using any programming or scripting language. The functional blocks may be implemented using various algorithms executed by one or more processors. Furthermore, the disclosure might employ known technologies for electronic settings, signal processing, and/or data processing.

In addition, connection lines or connection members between elements shown in the drawings illustrate functional connections and/or physical or circuit connections. Connections between elements may be represented by replaceable or additional various functional connections, physical connections, or circuit connections in an actual apparatus.

Reference will now be made in detail to embodiments of the disclosure, examples of which are illustrated in the accompanying drawings.

FIG. 1 is a diagram for describing an autonomous vehicle according to an embodiment of the disclosure.

Referring to FIG. 1, an autonomous vehicle 10 is a vehicle which is automatically driven by determining a driving environment without a driver's control. As an example, the autonomous vehicle 10 may be automatically driven by analyzing information received from various sensors such as a camera, a radar, a lidar, a global positioning system (GPS), and an inertial measurement unit (IMU). The autonomous vehicle 10 may include a vehicle-to-everything (V2X) module to communicate with various entities capable of affecting the autonomous vehicle 10 (e.g., a network, another vehicle, a pedestrian, a device, a grid, or the like).

The autonomous vehicle 10 may be controlled by a steering control unit and/or a speed control unit based on the information received from the various sensors. The various sensors used for autonomous driving may have errors as time passes due to various reasons such as an external impact, an external environment variation (e.g., a tire pressure variation while the autonomous vehicle 10 is being driven), or the like. Therefore, to improve the safety of the autonomous vehicle 10, the errors of the sensors serving as the basis of autonomous driving need to be minimized by periodically calibrating the sensors. Calibration refers to a technique for calculating correction values for converting sensing values of sensors into vehicle reference values through comparison between a sensor reference coordinate system and a vehicle reference coordinate system. The sensor reference coordinate system may consist of an origin of sensing values and coordinate axes. The vehicle reference coordinate system may consist of a data origin and coordinate axes for controlling a steering direction and a speed of the autonomous vehicle 10.

In general, a driver locates an autonomous vehicle at a specific place for calibration, and calibration is performed based on ground truth obtained by the autonomous vehicle stopped at the place. For example, the autonomous vehicle (or a separate calibrator or operator) may determine an error of each sensor and calibrate the sensor based on the obtained ground truth. However, performing calibration only at the specific place may cause inconvenience.

According to the disclosure, a method of increasing accuracy and efficiency of calibration by periodically performing calibration based on sensing values received from various sensors while an autonomous vehicle is being driven may be provided.

Figure 2:
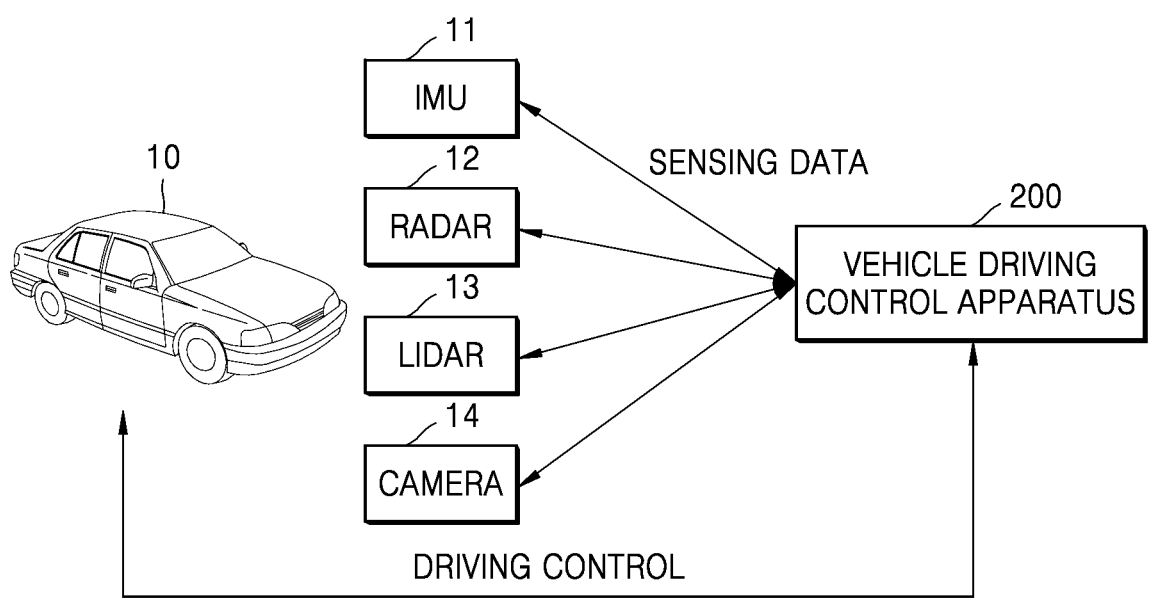
FIG. 2 is a diagram for describing an autonomous driving system according to an embodiment of the disclosure.

FIG. 2 is a diagram for describing an autonomous driving system according to an embodiment of the disclosure.

Referring to FIG. 2, the autonomous driving system may include the autonomous vehicle 10 supporting the autonomous driving system, and a vehicle driving control apparatus 200 for controlling driving of the autonomous vehicle 10. The vehicle driving control apparatus 200 may be a device separate from and mounted in the autonomous vehicle 10, a device included in the autonomous vehicle 10, or at least a part of an electronic device for controlling the autonomous vehicle 10. The vehicle driving control apparatus 200 may include at least parts of the steering control unit and the speed control unit illustrated in FIG. 1.

According to an embodiment of the disclosure, the autonomous vehicle 10 supporting autonomous driving may have mounted therein various sensors such as an IMU 11 for measuring a speed and a direction of the autonomous vehicle 10, gravity, and an acceleration, a radar 12 for recognizing an environment based on a reflection pattern of an irradiated electromagnetic pulse, a lidar 13 for recognizing a surrounding environment based on a reflection pattern of an irradiated low-power laser beam, and a camera 14 for capturing an image. The vehicle driving control apparatus 200 may receive sensing data from the sensors mounted in the autonomous vehicle 10 and control the autonomous vehicle 10 based on the received sensing data.

The vehicle driving control apparatus 200 may store map data including precise road information of a region through which the autonomous vehicle 10 is to be driven. The vehicle driving control apparatus 200 may control the speed and/or the direction of the autonomous vehicle 10 by analyzing the road information and information input from the sensors every moment, by driving an artificial intelligence (AI) program by using a high-speed graphics processing unit (GPU).

The vehicle driving control apparatus 200 may calibrate at least one sensor based on sensing data measured by the sensors while the autonomous vehicle 10 is being driven. A calibration method performed by the vehicle driving control apparatus 200 according to an embodiment of the disclosure will now be described with reference to FIG. 3.

Figure 3:
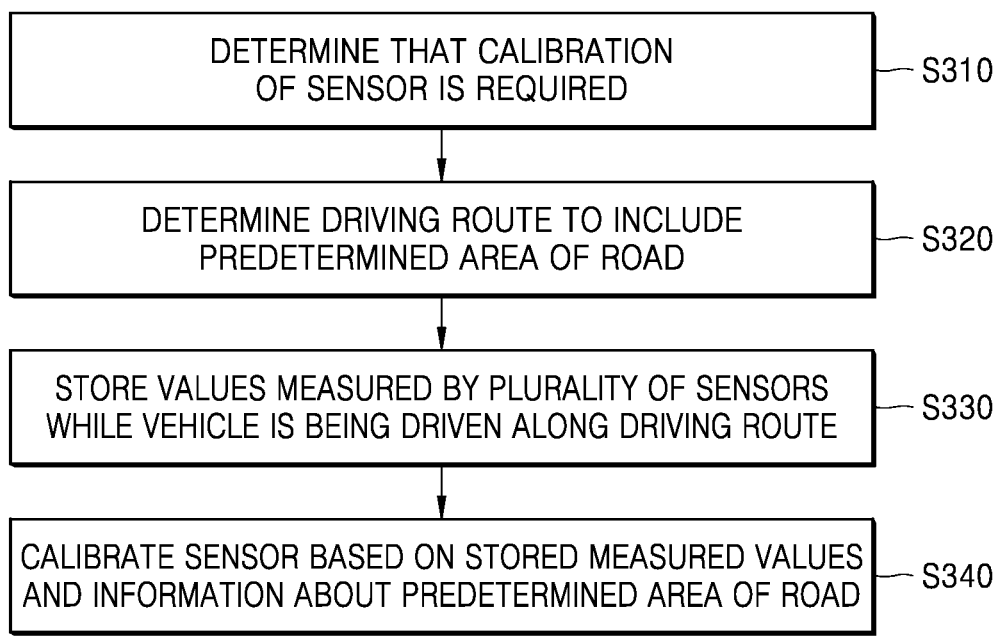
FIG. 3 is a flowchart of a calibration method performed by a vehicle driving control apparatus, according to an embodiment of the disclosure.

FIG. 3 is a flowchart of a calibration method performed by a vehicle driving control apparatus, according to an embodiment of the disclosure.

Referring to FIG. 3, to control driving of the vehicle based on information received from a plurality of sensors, the vehicle driving control apparatus 200 may determine that calibration of at least one sensor is required in operation S310. For example, the vehicle driving control apparatus 200 may determine that calibration of a first sensor among the plurality of sensors is required. The plurality of sensors may be mounted in the vehicle. The plurality of sensors may include at least one of an IMU, a camera, a radar, a lidar, a GPS, or the like.

The vehicle driving control apparatus 200 may determine that calibration of a certain sensor is required when sensing data received from the certain sensor indicates a value different from those of sensing data received from the other sensors. For example, the vehicle driving control apparatus 200 may determine whether calibration of the first sensor is required by comparing a value measured by the first sensor with values measured by the other sensors included in the plurality of sensors.

As an example, the vehicle driving control apparatus 200 may obtain a difference between three-dimensional (3D) point cloud data obtained from the lidar, and 3D point cloud data obtained from an image captured by the camera, by comparing the two data. The vehicle driving control apparatus 200 may obtain 3D coordinate values of points by applying an image feature extraction algorithm such as oriented FAST and rotated BRIEF (ORB) or scale-invariant feature transform (SIFT) to the image captured by the camera.

As another example, the vehicle driving control apparatus 200 may estimate location and position variations of the vehicle based on variations of the 3D coordinate values according to time. In addition, the vehicle driving control apparatus 200 may estimate location and position variations of the vehicle based on deceleration information and/or acceleration information obtained from the IMU. The vehicle driving control apparatus 200 may determine a difference between values sensed by different sensors by comparing the estimated location and position variations of the vehicle.

The vehicle driving control apparatus 200 may determine that calibration of the first sensor is required when a difference between the value measured by the first sensor and the values measured by the other sensors is equal to or greater than a threshold value.

Alternatively, the vehicle driving control apparatus 200 may determine whether calibration of the sensor is required by reconfiguring information about a road through which the vehicle is driven based on the sensing data received from the plurality of sensors and comparing the reconfigured information with previously known information about the road. The vehicle driving control apparatus 200 may determine whether calibration of the sensor is required by determining whether an error between the reconfigured information and the previously known information exceeds a threshold range.

Otherwise, the vehicle driving control apparatus 200 may previously store information about an error probability of each sensor and determine that calibration is required for a sensor, the error probability of which is calculated to be equal to or greater than a threshold value as time passes.

Alternatively, the vehicle driving control apparatus 200 may previously store a calibration cycle for each sensor. The vehicle driving control apparatus 200 may determine that calibration of a certain sensor is required when a certain time has passed after the sensor was calibrated.

In operation S320, the vehicle driving control apparatus 200 may determine a driving route to include a predetermined area of road.

The vehicle driving control apparatus 200 may previously store map data including information about an area of road used to calibrate each of the plurality of sensors. For example, the map data may include location information of the area of road used to calibrate each of the plurality of sensors and information about a shape of the area of road. The information about the area of road used to calibrate each sensor (hereinafter also referred to as a calibration area) may be tagged on the map data.

An area of road at which accurate information for 6 degrees of freedom (DoF) (e.g., x, y, z, roll, pitch, and yaw) calibration of each sensor can be acquired may be indicted as the calibration area on the map data. For example, an area of road at which accurate information for calibration of a sensor for sensing a roll about the X axis or a yaw about the Z axis of the vehicle can be acquired may be a roundabout. An area of road at which accurate information for calibration of a sensor for sensing a pitch about the Y axis of the vehicle can be acquired may be a straight flat road. An area of road at which accurate information for calibration of a depth sensor can be acquired may be an area of road at which a large number of corners of road facilities such as traffic signs are detected.

The vehicle driving control apparatus 200 may determine the driving route to include a predetermined area of road used to calibrate the first sensor (hereinafter also referred to as a calibration area of the first sensor), based on the previously stored map data. For example, the vehicle driving control apparatus 200 may find the calibration area of the first sensor in the map data. The vehicle driving control apparatus 200 may determine an area around a current location of the vehicle or an area around a driving route to a destination in the map data, as a search area. The vehicle driving control apparatus 200 may find the calibration area of the first sensor included in the determined search area. The vehicle driving control apparatus 200 may determine the driving route of the vehicle to include the calibration area of the first sensor.

Figure 5:
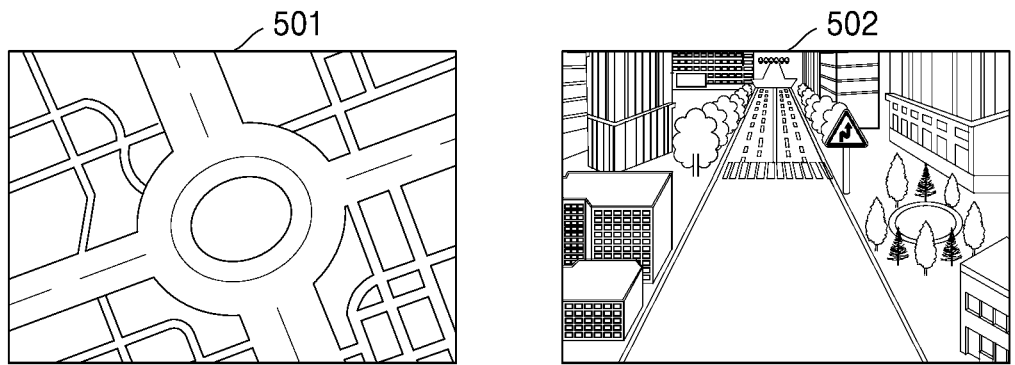
FIG. 5 is a diagram for describing an example of an area of road used to calibrate a sensor, according to an embodiment of the disclosure.

FIG. 5 is a diagram for describing an example of an area of road used to calibrate a sensor, according to an embodiment of the disclosure.

Referring to FIG. 5, the calibration area may include at least one of a roundabout 501 or a straight flat road 502. Upon determining in operation S310 that calibration of a sensor for sensing a roll about the X axis or a yaw about the Z axis of the vehicle is required, the vehicle driving control apparatus 200 may determine the driving route to include a roundabout. Alternatively, upon determining in operation S310 that calibration of a sensor for sensing a pitch about the Y axis of the vehicle is required, the vehicle driving control apparatus 200 may determine the driving route to include a straight flat road. Otherwise, upon determining in operation S310 that calibration of a depth sensor such as a lidar is required, the vehicle driving control apparatus 200 may determine the driving route to include an area of road at which a large number of corners of road facilities such as traffic signs are detected.

The vehicle driving control apparatus 200 may determine the driving route in such a manner that the vehicle is driven by a distance greater than a driving distance along the shortest route to the destination by a threshold value or less. The vehicle driving control apparatus 200 may control the vehicle to be driven through an area of road for calibration within a threshold range to prevent an excessively long detour for calibration.

The vehicle driving control apparatus 200 may control the vehicle to be driven along the determined driving route only when a difference between a driving distance of the vehicle along the shortest route to the destination (hereinafter also referred to as a shortest driving distance) and a driving distance of the vehicle along the driving route determined to include the calibration area (hereinafter also referred to as a driving distance for calibration) is equal to or less than a threshold value. The vehicle driving control apparatus 200 may control the vehicle to ignore the determined driving route and be driven along the shortest route when the difference between the shortest driving distance and the driving distance for calibration is greater than the threshold value.

Figure 6:
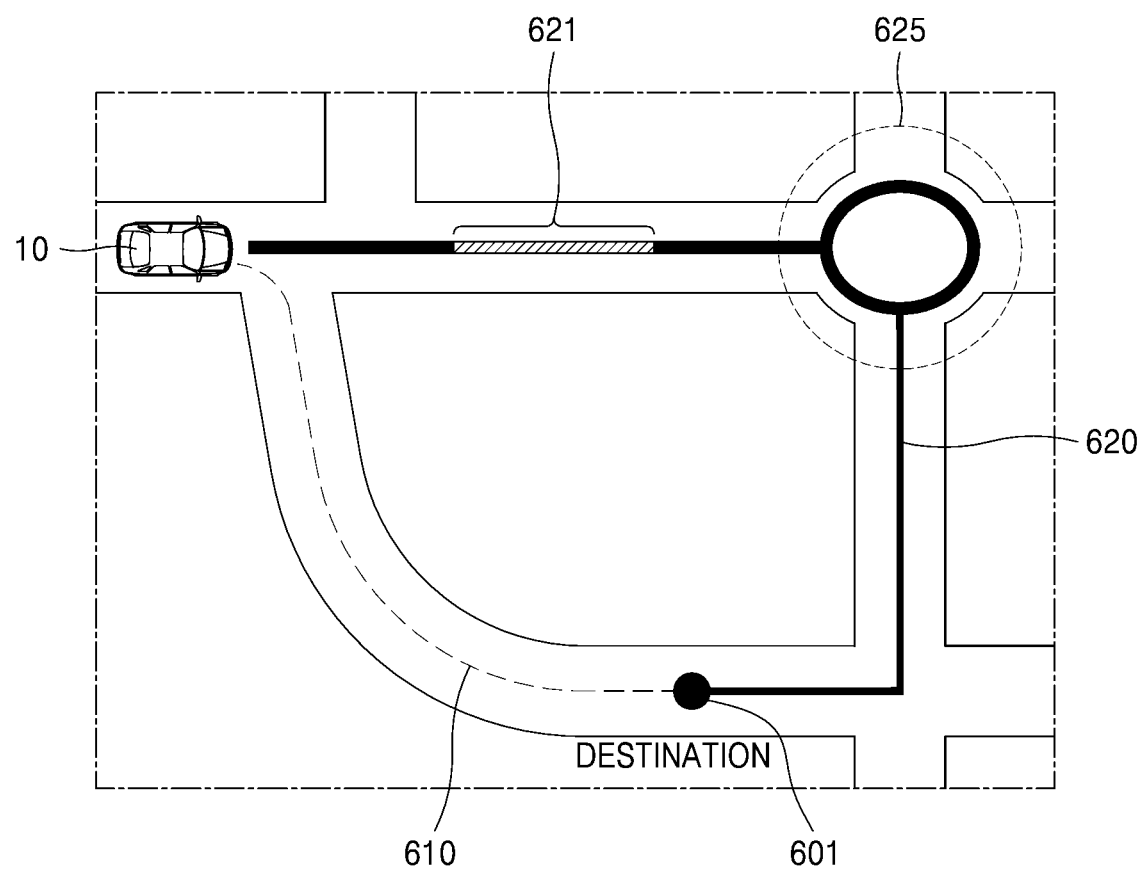
FIG. 6 is a diagram for describing a driving route determined to include an area of road used to calibrate a sensor, according to an embodiment of the disclosure.

FIG. 6 is a diagram for describing a driving route determined to include an area of road used to calibrate a sensor, according to an embodiment of the disclosure.

Referring to FIG. 6, the vehicle driving control apparatus 200 may determine a driving route 620 to include calibration areas 621 and 625 between a current location of the autonomous vehicle 10 and a destination 601. The vehicle driving control apparatus 200 may control the autonomous vehicle 10 to be driven along the driving route 620 when a driving distance of the autonomous vehicle 10 along the driving route 620 determined to include the calibration areas 621 and 625 is acceptable compared to a driving distance of the autonomous vehicle 10 along a shortest route 610 to the destination 601.

In operation S330, the vehicle driving control apparatus 200 may store values measured by the plurality of sensors while the vehicle is being driven along the driving route.

The vehicle driving control apparatus 200 may control the vehicle to be driven along the driving route determined in operation S320. In addition, the vehicle driving control apparatus 200 may receive the values measured by the plurality of sensors while the vehicle is being driven and use the values to control the vehicle.

The vehicle driving control apparatus 200 may store the values periodically measured by the plurality of sensors. For example, the vehicle driving control apparatus 200 may store data about a location of the vehicle, a shape of an area of road through which the vehicle is driven, or a position of the vehicle in the form of a point cloud by using the GPS, the IMU, the lidar, the radar, or the camera. The point cloud refers to a set of an enormous number of points and may be expressed as a vector including a location coordinate to indicate a point in three dimensions.

In addition, the vehicle driving control apparatus 200 may control the vehicle to be repeatedly driven through the calibration area, with permission of a user. The vehicle driving control apparatus 200 may provide, to the user, a user interface (UI) for requesting permission of the user for repeated driving for calibration. The vehicle driving control apparatus 200 may receive an input of the user in response to the UI. The vehicle driving control apparatus 200 may determine the driving route in such a manner that the vehicle is repeatedly driven through the calibration area, based on the input of the user.

Figure 7:
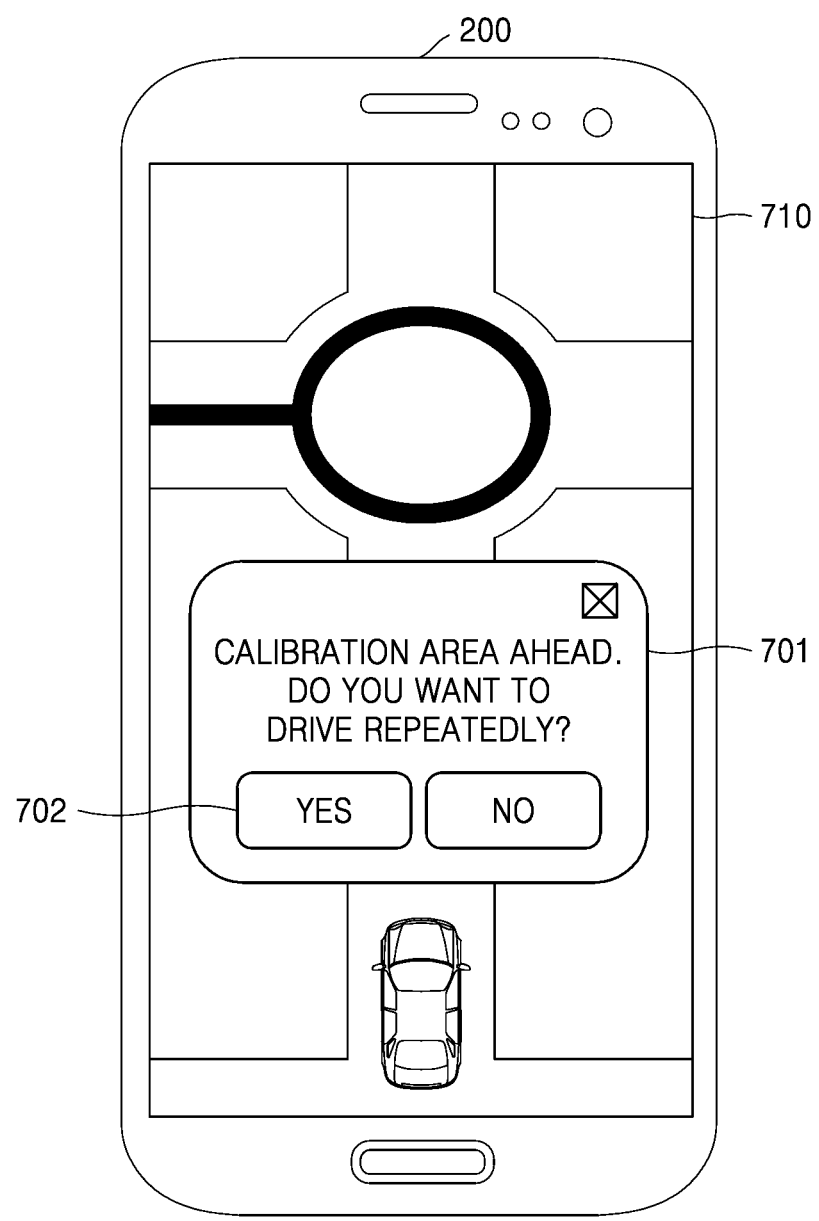
FIG. 7 illustrates an example of a user interface (UI) provided by a vehicle driving control apparatus to request permission of a user for repeated driving for calibration, according to an embodiment of the disclosure.

FIG. 7 illustrates an example of a UI provided by a vehicle driving control apparatus to request permission of a user for repeated driving for calibration, according to an embodiment of the disclosure.

Referring to FIG. 7, the vehicle driving control apparatus 200 may include a touchscreen 710 capable of displaying an image and receiving a touch input. The vehicle driving control apparatus 200 may display, on the touchscreen 710, a graphical user interface (GUI) 701 for requesting permission of the user for repeated driving for calibration. The vehicle driving control apparatus 200 may control the vehicle to be repeatedly driven through a calibration area, based on a touch input of the user on a button 702 for permitting repeated driving.

For example, the vehicle driving control apparatus 200 may request permission of the user for repeated driving through the calibration area, when calibration has not been performed for a long time or upon determining that information collected by the sensors while the vehicle is being driven through the calibration area is inaccurate. For example, the vehicle driving control apparatus 200 may perform additional calibration by controlling the vehicle to be repeatedly driven as needed through a calibration area, repeated driving through which does not waste much time, e.g., a roundabout, with permission of the user. The vehicle driving control apparatus 200 may increase sensor calibration accuracy by controlling the vehicle to be repeatedly driven through the calibration area.

In operation S340, the vehicle driving control apparatus 200 may calibrate the sensor based on the stored measured values and information about the predetermined area of road.

The vehicle driving control apparatus 200 may collect driving information from the plurality of sensors while the vehicle is being driven along the driving route that has been changed to include the calibration area. The vehicle driving control apparatus 200 may calibrate the sensor when a reliability of calibration based on the collected driving information is equal to or greater than a threshold value. The vehicle driving control apparatus 200 may calibrate the sensor based on the measured values stored while the vehicle is being driven or after driving of the vehicle is terminated.

For example, the vehicle driving control apparatus 200 may calibrate the first sensor, which is determined to require calibration in operation S310, based on the stored measured values and information about the predetermined area of road. The vehicle driving control apparatus 200 may collect sensing data suitable for characteristics of the calibration area and perform calibration. The vehicle driving control apparatus 200 may calibrate the sensor requiring calibration based on a driving history through the calibration area by using only data of the sensor.

The vehicle driving control apparatus 200 may obtain, from the previously stored map data, information about a shape of the predetermined area of road as the information about the predetermined area of road. The vehicle driving control apparatus 200 may reconfigure the shape of the predetermined area of road based on the stored measured values. The vehicle driving control apparatus 200 may calibrate the first sensor by comparing the reconfigured shape of the predetermined area of road with the shape of the predetermined area of road obtained from the map data.

As an example, when the vehicle is driven along a driving route including a roundabout, the vehicle driving control apparatus 200 may determine whether the shape of the area of road, reconfigured based on the values measured by the sensors, is a closed loop shape. The vehicle driving control apparatus 200 may calibrate the sensor in such a manner that the shape of the area of road reconfigured based on the values measured by the sensors is a closed loop shape.

As another example, when the vehicle is driven along a driving route including a straight flat road, the vehicle driving control apparatus 200 may determine whether the shape of the area of road reconfigured based on the values measured by the sensors indicates a curved or inclined road. The vehicle driving control apparatus 200 may calibrate the sensor in such a manner that the shape of the area of road reconfigured based on the values measured by the sensors indicates a straight and flat road.

Alternatively, the vehicle driving control apparatus 200 may obtain information about a location of the predetermined area of road as the information about the predetermined area of road. The vehicle driving control apparatus 200 may calibrate the first sensor in such a manner that sensing data received from the first sensor indicates the same value as sensing data received from the other sensors, based on data measured while the vehicle is being driven through the predetermined area of road.

Upon determining that calibration of two or more sensors is required, the vehicle driving control apparatus 200 may apply various correction values to the sensors determined to require calibration. The vehicle driving control apparatus 200 may find an optimally matching correction value within a preset error range from map data on which results obtained by applying various correction values to sensors are previously stored and calibrate the sensors by using the found correction value.

In addition, the vehicle driving control apparatus 200 may control the vehicle to be additionally autonomously driven for calibration during a driver's absence, with permission of the user.

The vehicle driving control apparatus 200 may provide, to the user, a UI for requesting permission of the user for additional driving for calibration. The vehicle driving control apparatus 200 may receive an input of the user in response to the UI. The vehicle driving control apparatus 200 may control the vehicle to be additionally driven for calibration after driving intended by the user is terminated. The vehicle driving control apparatus 200 may store values additionally measured by the plurality of sensors while the vehicle is being additionally driven. The vehicle driving control apparatus 200 may calibrate the first sensor based on the measured values stored while the vehicle is being driven along the determined driving route, the information about the predetermined area of road, and the additionally measured values.

Figure 8:
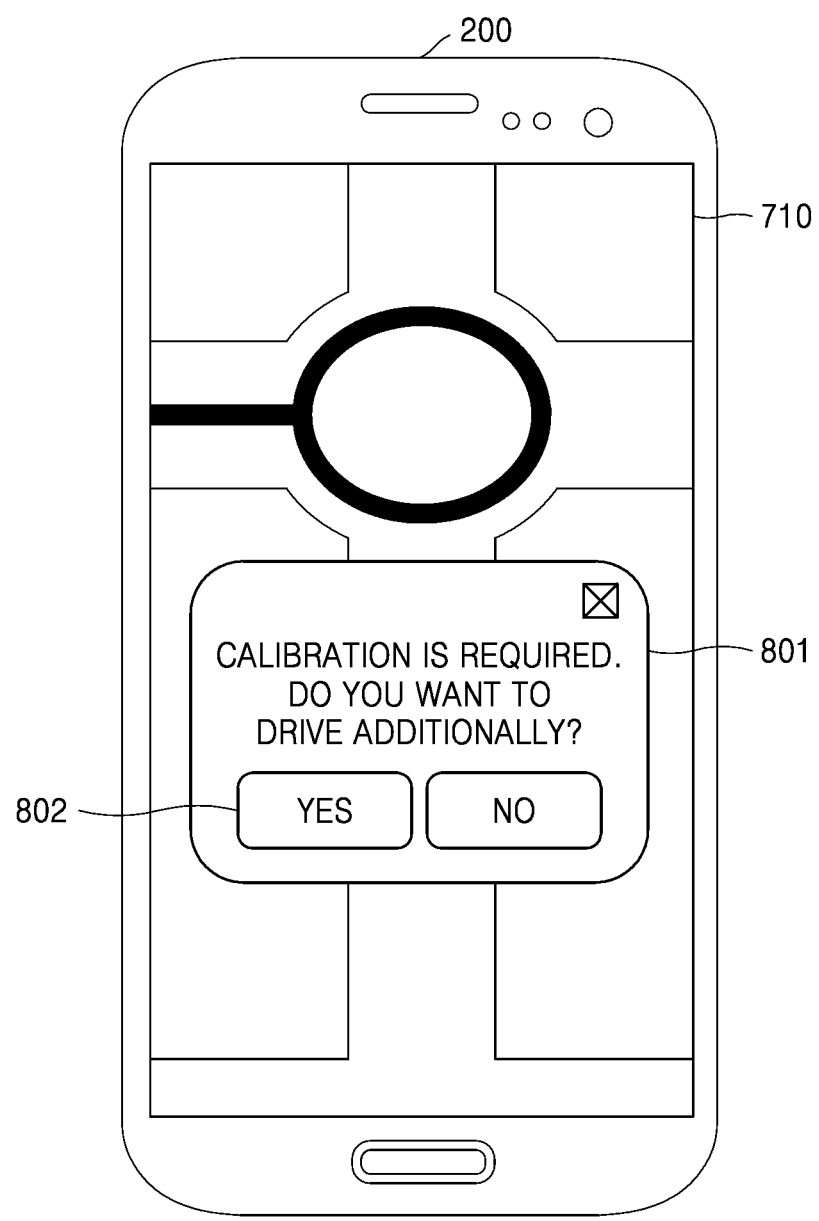
FIG. 8 illustrates an example of a UI provided by a vehicle driving control apparatus to request permission of a user for additional driving for calibration, according to an embodiment of the disclosure.

FIG. 8 illustrates an example of a UI provided by a vehicle driving control apparatus to request permission of a user for additional driving for calibration, according to an embodiment of the disclosure.

Referring to FIG. 8, the vehicle driving control apparatus 200 may display, on a touchscreen 710, a GUI 801 for requesting permission of the user for additional driving for calibration. The vehicle driving control apparatus 200 may control the vehicle to be additionally driven for calibration after driving intended by the user is terminated, based on a touch input of the user on a button 802 for permitting additional driving.

The vehicle driving control apparatus 200 may increase sensor calibration accuracy by additionally collecting sensing data through additional driving.

The vehicle driving control apparatus 200 may update the previously stored map data based on the values measured by the plurality of sensors while the vehicle is being driven. The vehicle driving control apparatus 200 may continuously collect the sensing data or the map data reconfigured based on the sensing data and update the stored map data based on the collected information.

The vehicle driving control apparatus 200 may delete an indication of a calibration area where sensor calibration characteristics are lost. For example, the vehicle driving control apparatus 200 may delete an indication of a calibration area where lane information is lost. Alternatively, the vehicle driving control apparatus 200 may add an indication of a calibration area where clear sensor calibration characteristics are newly determined.

Figure 4:
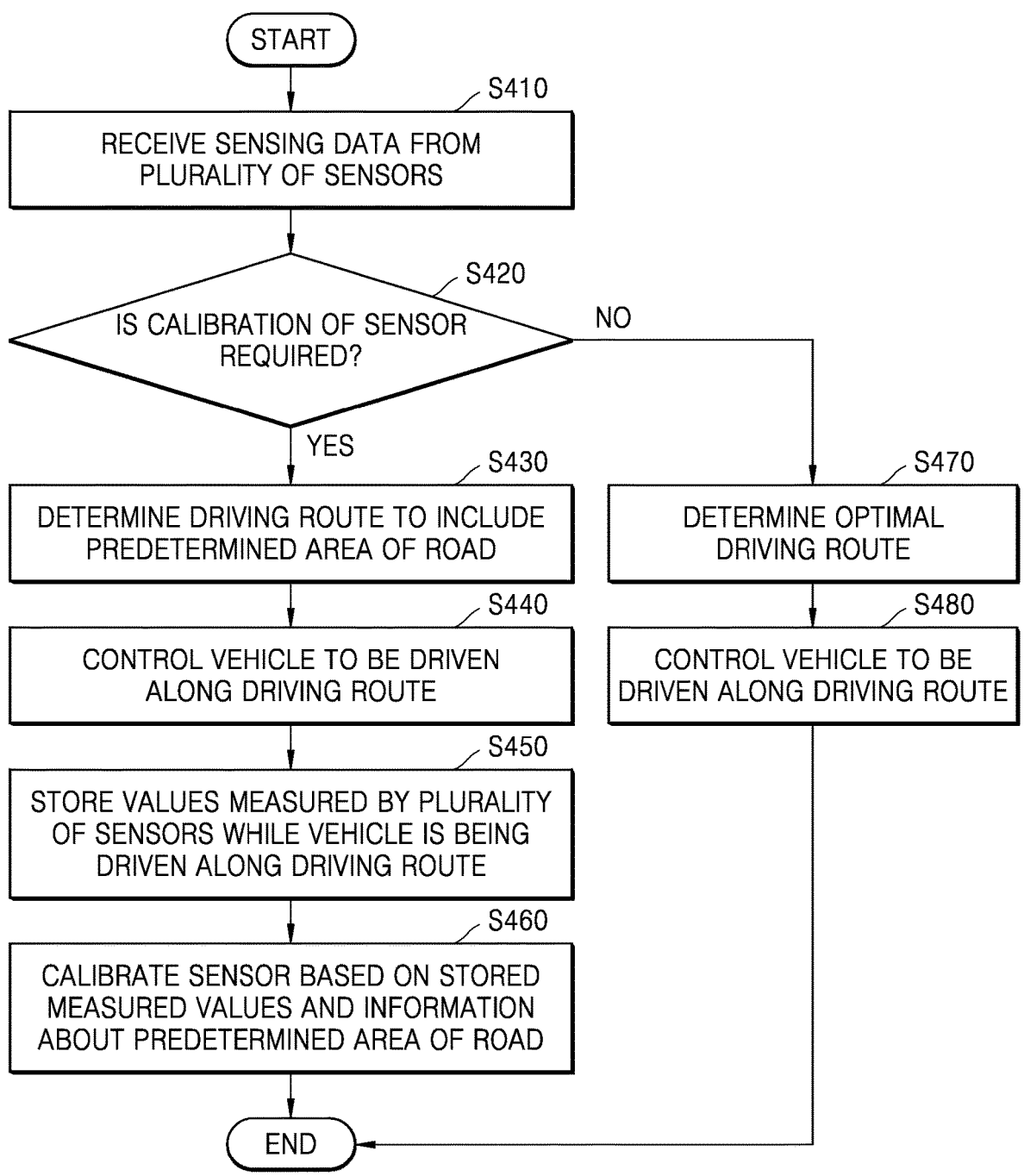
FIG. 4 is a detailed flowchart of a calibration method performed by a vehicle driving control apparatus, according to an embodiment of the disclosure.

FIG. 4 is a detailed flowchart of a calibration method performed by a vehicle driving control apparatus, according to an embodiment of the disclosure.

Referring to FIG. 4, operations S410 and S420 correspond to operation S310 of FIG. 3, operation S430 of FIG. 4 corresponds to operation S320 of FIG. 3, operations S440 and S450 of FIG. 4 correspond to operation S330 of FIG. 3, and operation S460 of FIG. 4 corresponds to operation S340 of FIG. 3. The above description provided in relation to FIG. 3 may also be applied to corresponding operations of FIG. 4. A repeated description will not be provided herein.

In operation S410, the vehicle driving control apparatus 200 may receive sensing data from a plurality of sensors mounted in the vehicle. The vehicle driving control apparatus 200 may periodically receive the sensing data from the plurality of sensors, and control driving of the vehicle based on the received sensing data.

In operation S420, the vehicle driving control apparatus 200 may determine whether calibration of a sensor is required. The vehicle driving control apparatus 200 may determine the sensor requiring calibration based on a driving history. The vehicle driving control apparatus 200 may determine the sensor requiring calibration by comparing the sensing data received from the sensors.

In operation S430, upon determining in operation S420 that calibration of at least one sensor is required, the vehicle driving control apparatus 200 may determine a driving route to include a predetermined area of road (e.g., a predetermined calibration area) with respect to the at least one sensor. In operation S440, the vehicle driving control apparatus 200 may control the vehicle to be driven along the driving route determined in operation S430. In operation S450, the vehicle driving control apparatus 200 may store values measured by the plurality of sensors while the vehicle is being driven. In operation S460, the vehicle driving control apparatus 200 may calibrate the sensor based on the stored measured values and information about a predetermined area of road. For example, the vehicle driving control apparatus 200 may calibrate the at least one sensor based on data measured while the vehicle is being driven through the calibration area.

On the contrary, in operation S470, upon determining in operation S420 that no sensor requires calibration, the vehicle driving control apparatus 200 may determine an optimal driving route to a destination. In operation S480, the vehicle driving control apparatus 200 may control the vehicle to be driven along the driving route determined in operation S470.

Therefore, the vehicle driving control apparatus 200 may minimize errors of sensors by continuously calibrating the sensors while the vehicle is being driven. Furthermore, the vehicle driving control apparatus 200 may increase calibration efficiency and minimize inconvenience of a user by performing calibration based on map data without inconveniently visiting a specific place for calibration.

In addition, the vehicle driving control apparatus 200 may improve safety of the autonomous vehicle by controlling the vehicle to be repeatedly driven through a calibration area until accuracy of calibration reaches a desired level. For example, when the vehicle is controlled, with permission of the user, to be repeatedly driven through a driving route including both a roundabout and a straight flat road like the driving route 620 of FIG. 6, the vehicle driving control apparatus 200 may maximize calibration accuracy.

In addition, the vehicle driving control apparatus 200 may provide convenience to the user by autonomously performing calibration without a command of the user by controlling the vehicle to be additionally driven through a calibration area even after driving intended by the user is terminated.

As described above in relation to FIGS. 2 to 8, the vehicle driving control apparatus 200 may determine a driving route to include a calibration area, by storing map data. However, embodiments of the disclosure are not limited to the above description. The vehicle driving control apparatus 200 may be connected to a navigation server and receive, from the navigation server, a driving route including a calibration area.

Figure 9:
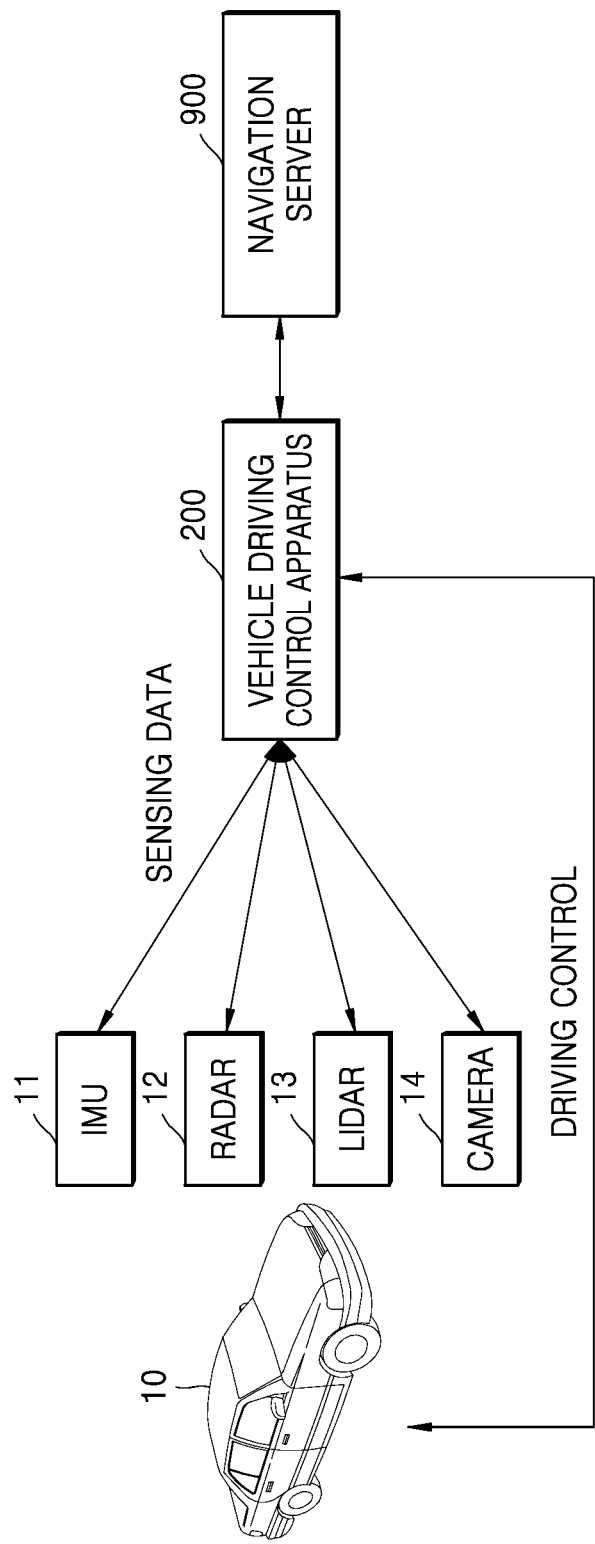
FIG. 9 is a diagram for describing an autonomous driving system according to an embodiment of the disclosure.

FIG. 9 is a diagram for describing an autonomous driving system according to an embodiment of the disclosure.

Referring to FIG. 9, the autonomous driving system may include the autonomous vehicle 10 supporting the autonomous driving system and the vehicle driving control apparatus 200 for controlling driving of the autonomous vehicle 10. The autonomous vehicle 10 may have mounted therein various sensors such as an such as the IMU 11, the radar 12, the lidar 13, and the camera 14. The vehicle driving control apparatus 200 may be connected to a navigation server 900 in a wireless manner.

The navigation server 900 may store map data for determining a driving route of the autonomous vehicle 10. The navigation server 900 may dynamically update the driving route while the autonomous vehicle 10 is being driven. For example, the navigation server 900 may receive, from the vehicle driving control apparatus 200, data collected by a GPS module mounted in the autonomous vehicle 10 and use the received data to determine the driving route of the autonomous vehicle 10.

The vehicle driving control apparatus 200 may transmit, to the navigation server 900, information about a sensor requiring calibration. The navigation server 900 may determine the driving route to include a predetermined area of road used to calibrate the sensor and transmit the determined driving route to the vehicle driving control apparatus 200. The vehicle driving control apparatus 200 may calibrate at least one sensor based on sensing data measured by sensors while the autonomous vehicle 10 is being driven.

The description provided above in relation to FIGS. 2 to 8 may also be applied to a method, performed by the vehicle driving control apparatus 200, of controlling the autonomous vehicle 10 and calibrating sensors. A repeated description will not be provided herein.

A calibration method performed by the vehicle driving control apparatus 200 will now be described with reference to FIG. 10.

Figure 10:
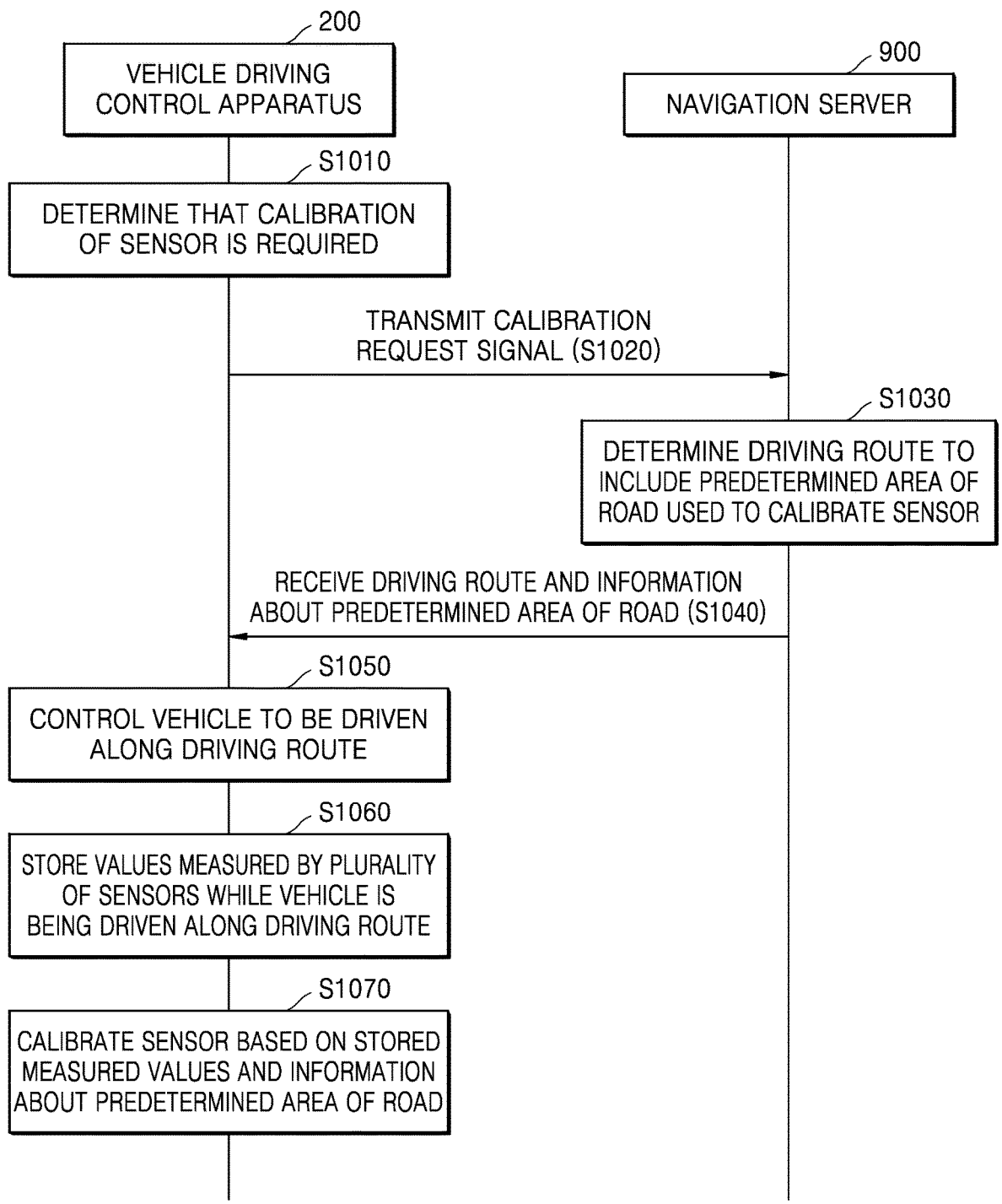
FIG. 10 is a flowchart of a calibration method performed by a vehicle driving control apparatus connected to a navigation server, according to an embodiment of the disclosure.

FIG. 10 is a flowchart of a calibration method performed by a vehicle driving control apparatus connected to a navigation server, according to an embodiment of the disclosure.

Referring to FIG. 10, the vehicle driving control apparatus 200 may control the vehicle based on information received from a plurality of sensors, and receive a driving route of the vehicle from the navigation server 900 connected thereto in a wireless manner.

Operation S1010 of FIG. 10 corresponds to operation S310 of FIG. 3, operations S1050 and S1060 of FIG. 10 correspond to operation S330 of FIG. 3, and operation S1070 of FIG. 10 corresponds to operation S340 of FIG. 3.

The above description provided above in relation to FIG. 3 may also be applied to corresponding operations of FIG. 10. A repeated description will not be provided herein.

In operation S1010, the vehicle driving control apparatus 200 may determine that calibration of a sensor is required.

The vehicle driving control apparatus 200 may receive sensing data from a plurality of sensors mounted in the vehicle. The vehicle driving control apparatus 200 may determine the sensor requiring calibration by comparing the sensing data received from the sensors. For example, the vehicle driving control apparatus 200 may determine that calibration of a first sensor among the plurality of sensors is required.

In operation S1020, the vehicle driving control apparatus 200 may transmit, to the navigation server 900, a signal indicating that calibration is required. For example, the vehicle driving control apparatus 200 may transmit, to the navigation server 900, information about the sensor requiring calibration. Upon determining that calibration of the first sensor is required, the vehicle driving control apparatus 200 may transmit, to the navigation server 900, information about the first sensor as a signal indicating that calibration of the first sensor is required.

When the signal indicating that calibration of the sensor mounted in the vehicle is required is received from the vehicle driving control apparatus 200, the navigation server 900 may determine a driving route of the vehicle based on the received signal.

In operation S1030, the navigation server 900 may determine a driving route to include a predetermined area of road used to calibrate the sensor, based on map data including information about an area of road used to calibrate each of the plurality of sensors. For example, the navigation server 900 may receive the information about the first sensor from the vehicle driving control apparatus 200 and determine the driving route to include a calibration area of the first sensor.

According to an embodiment of the disclosure, the area of road used to calibrate each of the plurality of sensors may include at least one of a roundabout or a straight flat road, and information about the area of road used to calibrate each of the plurality of sensors may include location information of the area of road and information about a shape of the area of road.

For example, to determine the driving route of the vehicle, when calibration of a sensor for sensing a roll about the X axis or a yaw about the Z axis of the vehicle is required, the navigation server 900 may determine the driving route to include a roundabout. When calibration of a sensor for sensing a pitch about the Y axis of the vehicle is required, the navigation server 900 may determine the driving route to include a straight flat road.

To determine the driving route from a current location of the vehicle to a destination, the navigation server 900 may determine the driving route in such a manner that the vehicle is driven by a distance greater than a driving distance along the shortest route by a threshold value or less. The navigation server 900 may control the vehicle to be driven through an area of road for calibration within a threshold range to prevent an excessively long detour for calibration.

The navigation server 900 may transmit, to the vehicle driving control apparatus 200, the determined driving route and information about the predetermined area of road used to calibrate the sensor.

In operation S1040, the vehicle driving control apparatus 200 may receive the driving route determined to include the predetermined area of road, from the navigation server 900 in response to the signal transmitted in operation S1020. The information about the predetermined area of road may include location information of a calibration area found by the navigation server 900 based on the signal transmitted in operation S1020, or information about a shape of the calibration area.

In operation S1050, the vehicle driving control apparatus 200 may control the vehicle to be driven along the driving route provided by the navigation server 900.

To control the vehicle to be driven along the driving route provided by the navigation server 900, the vehicle driving control apparatus 200 may control the vehicle to be repeatedly driven through the calibration area, with permission of a user.

In operation S1060, the vehicle driving control apparatus 200 may store values measured by the plurality of sensors while the vehicle is being driven along the driving route. In operation S1070, the vehicle driving control apparatus 200 may calibrate the sensor based on the stored measured values and the information about the predetermined area of road. For example, the vehicle driving control apparatus 200 may calibrate the first sensor determined to require calibration.

The navigation server 900 may receive, from the vehicle driving control apparatus 200, the values measured by the sensors while the vehicle is being driven along the driving route. The navigation server 900 may update the map data based on the received measured values.

In addition, the vehicle driving control apparatus 200 may control the vehicle to be additionally autonomously driven for calibration during a driver's absence, with permission of the user. The vehicle driving control apparatus 200 may calibrate the sensor based on the measured values stored while the vehicle is being driven along the determined driving route, and values measured while the vehicle is being additionally driven.

Figure 11A:
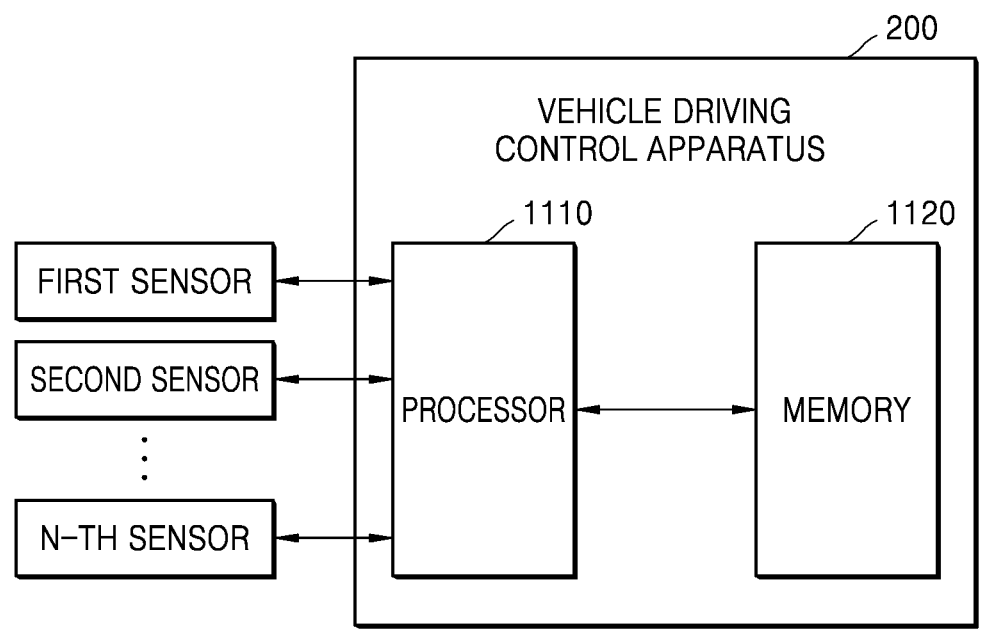
FIG. 11A is a block diagram of a vehicle driving control apparatus according to an embodiment of the disclosure.

FIG. 11A is a block diagram of a vehicle driving control apparatus according to an embodiment of the disclosure.

Figure 11B:
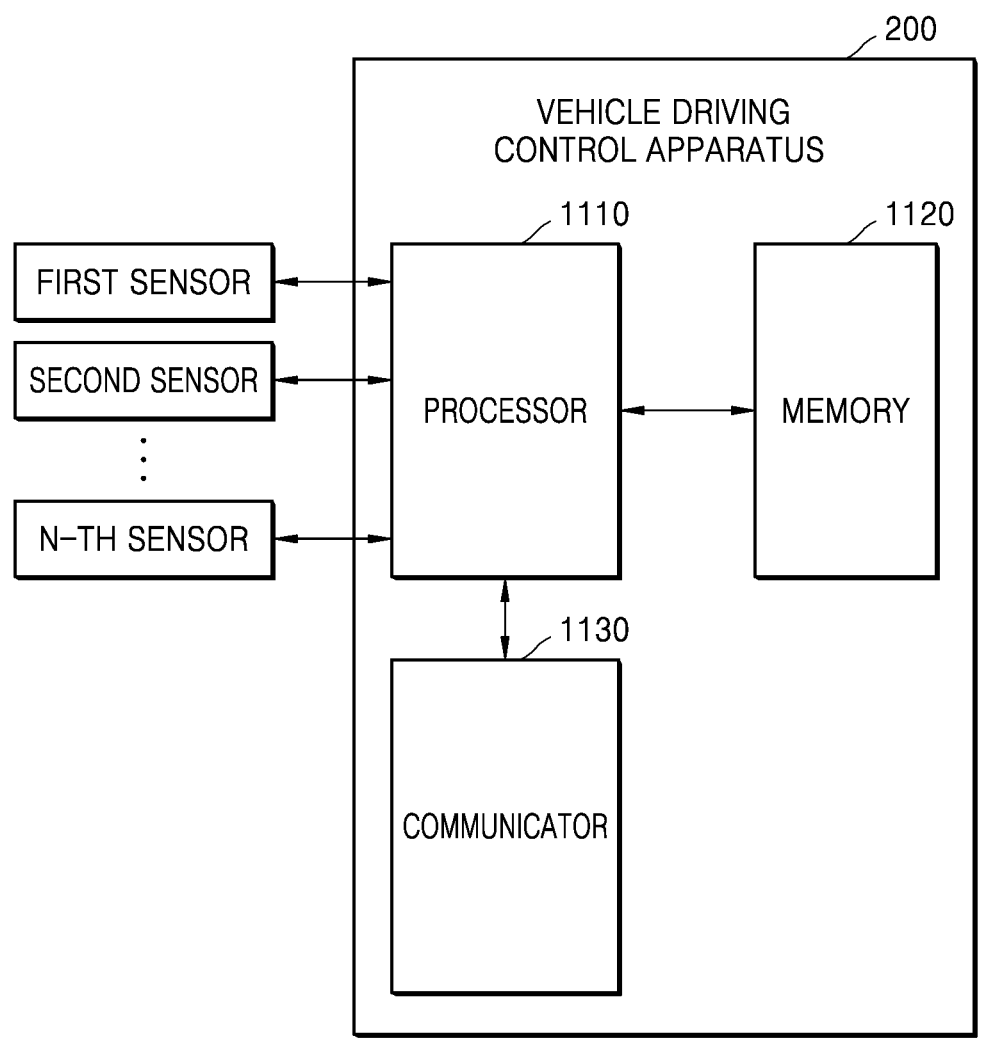
FIG. 11B is a block diagram of a vehicle driving control apparatus according to an embodiment of the disclosure.

FIG. 11B is a block diagram of a vehicle driving control apparatus according to an embodiment of the disclosure.

Referring to FIGS. 11A and 11B, the vehicle driving control apparatus 200 may include a processor 1110 and a memory 1120. However, the vehicle driving control apparatus 200 may include a larger number of elements compared to those illustrated in FIG. 11A. For example, as illustrated in FIG. 11B, the vehicle driving control apparatus 200 may further include a communicator 1130.

Although the vehicle driving control apparatus 200 includes a single processor in FIGS. 11A and 11B, embodiments of the disclosure are not limited thereto and the vehicle driving control apparatus 200 may include a plurality of processors. At least some operations and functions of the processor 1110 described below may also be performed by a plurality of processors. The vehicle driving control apparatus 200 illustrated in FIGS. 11A and 11B may perform the methods described above in relation to FIGS. 3, 4, and 10, and a repeated description will not be provided herein.

The processor 1110 controls overall operations of the vehicle driving control apparatus 200. For example, the processor 1110 may control the other elements included in the vehicle driving control apparatus 200 (e.g., the memory 1120), by executing a program stored in the vehicle driving control apparatus 200.

According to an embodiment of the disclosure, the processor 1110 may control driving of the vehicle and calibrate at least one sensor based on information received from a plurality of sensors.

The processor 1110 may determine the sensor requiring calibration by receiving sensing data from the plurality of sensors and comparing the sensing data received from the sensors. For example, upon determining that calibration of a first sensor is required, the processor 1110 may determine a driving route to include a predetermined area of road used to calibrate the first sensor.

The processor 1110 may store, in the memory 1120, values measured by the plurality of sensors while the vehicle is being driven along the driving route. The processor 1110 may calibrate the first sensor based on the stored measured values and information about the predetermined area of road.

According to an embodiment of the disclosure, the memory 1120 may store a program for processing and control operations of the processor 1110, and store data input to or to be output from the vehicle driving control apparatus 200.

The memory 1120 may store map data including information about an area of road used to calibrate each of the plurality of sensors, and values measured by the plurality of sensors while the vehicle is being driven. The memory 1120 may store at least one of location information of a calibration area or information about a shape of the calibration area, as information about the calibration area.

The processor 1110 may determine the driving route to include the predetermined area of road used to calibrate the sensor determined to require calibration, based on the map data.

For example, when calibration of a sensor for sensing a roll about the X axis or a yaw about the Z axis of the vehicle is required, the processor 1110 may determine the driving route to include a roundabout. When calibration of a sensor for sensing a pitch about the Y axis of the vehicle is required, the processor 1110 may determine the driving route to include a straight flat road.

The processor 1110 may obtain the information about the shape of the calibration area from the memory 1120. The processor 1110 may reconfigure the shape of the calibration area based on the values measured by the plurality of sensors while the vehicle is being driven along the driving route. The processor 1110 may calibrate the first sensor by comparing the reconfigured shape of the calibration area with the shape of the calibration area obtained from the memory 1120.

The processor 1110 may update the map data based on the values measured by the plurality of sensors while the vehicle is being driven.

The vehicle driving control apparatus 200 may further include the communicator 1130 capable of exchanging data with the navigation server 900.

Upon determining that calibration of the first sensor is required, the communicator 1130 may transmit, to the navigation server 900, a signal indicating that calibration of the first sensor is required. The communicator 1130 may receive a driving route determined to include a predetermined area of road from the navigation server 900 in response to the transmitted signal.

Figure 12:
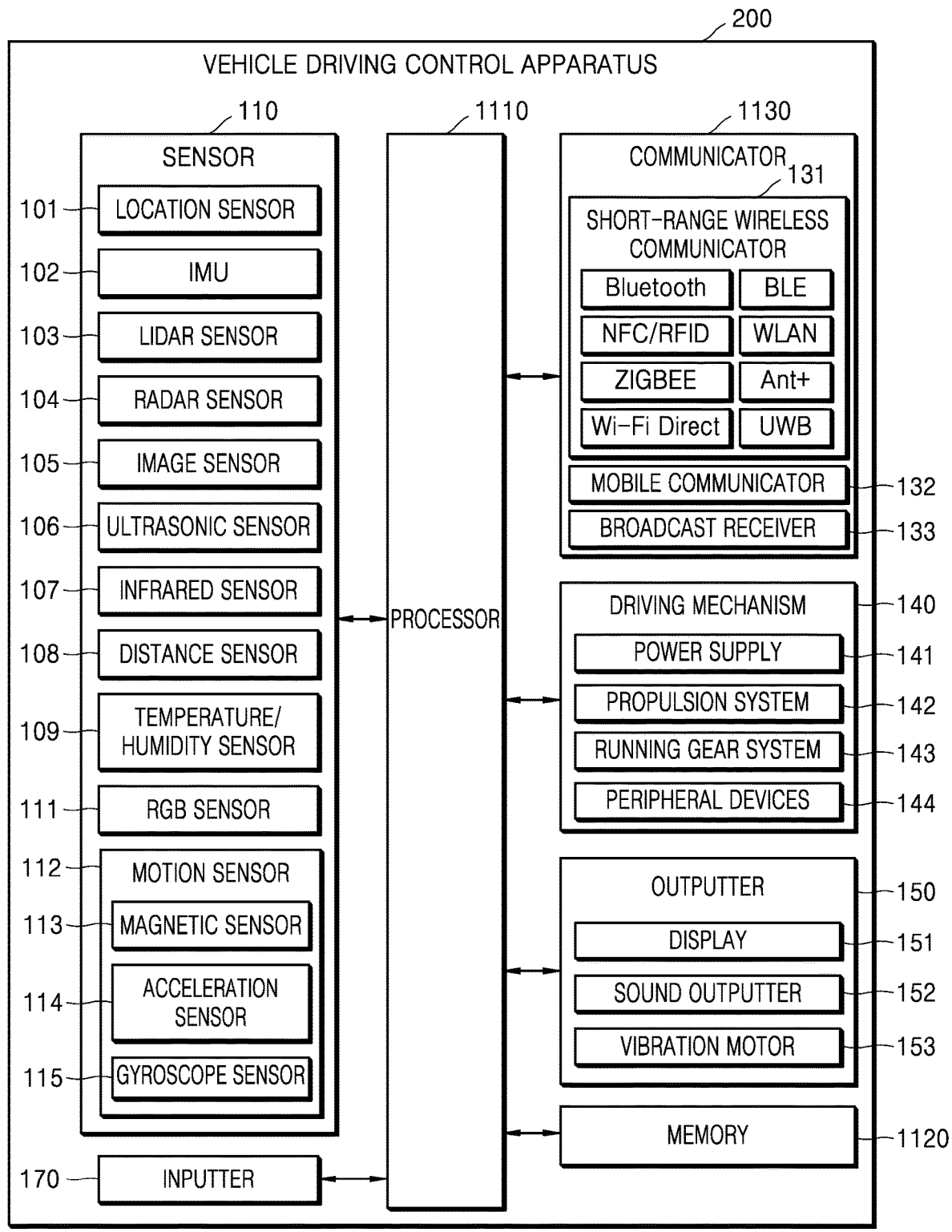
FIG. 12 is a detailed block diagram of a vehicle driving control apparatus according to an embodiment of the disclosure.

FIG. 12 is a detailed block diagram of a vehicle driving control apparatus according to an embodiment of the disclosure.

Referring to FIG. 12, the vehicle driving control apparatus 200 may include a sensor 110, the processor 1110, the communicator 1130, a driving mechanism 140, an outputter 150, the memory 1120, and an inputter 170.

Although the sensor 110 of the vehicle driving control apparatus 200 includes a plurality of sensors in FIG. 12, embodiments of the disclosure are not limited thereto. The sensor 110 may be separated from the vehicle driving control apparatus 200.

Not all elements illustrated in FIG. 12 are essential elements of the vehicle driving control apparatus 200. The vehicle driving control apparatus 200 may include a larger or smaller number of elements compared to those illustrated in FIG. 12. For example, the vehicle driving control apparatus 200 may include the processor 1110 and the memory 1120 as illustrated in FIG. 11A, or include the processor 1110, the memory 1120, and the communicator 1130 as illustrated in FIG. 11B.

As described above, the vehicle driving control apparatus 200 may be a device separate from and mounted in the vehicle, a device included in the vehicle, or at least a part of an electronic device for controlling the vehicle.

Each element will now be described.

The sensor 110 may include a plurality of sensors configured to sense information about a surrounding environment of the vehicle. For example, the sensor 110 may include at least one of a location sensor 101 (e.g., a global positioning system (GPS), a differential GPS (DGPS), an inertial navigation system (INS), or the like), an inertial measurement unit (IMU) 102, a lidar sensor 103, a radar sensor 104, an image sensor 105 (e.g., a camera, stereo camera, a mono camera, a wide angle camera, an around view camera, a three-dimensional (3D) vision sensor, or the like), an ultrasonic sensor 106, an infrared sensor 107, a distance sensor 108, a temperature/humidity sensor 109, a red, green, and blue (RGB) sensor 111, or a motion sensor 112, but is not limited thereto. For example, the sensor 110 may also include a barometric pressure sensor, a dust sensor, or the like.

The motion sensor 112 may be used to sense motion of the vehicle, and include at least one of, for example, a magnetic sensor 113, an acceleration sensor 114, or a gyroscope sensor 115, but is not limited thereto.

The image sensor 105 may include a plurality of cameras provided at a plurality of locations inside or outside the vehicle. For example, three cameras may be provided at a front part of the vehicle, one camera may be provided at a rear part of the vehicle, two cameras may be provided at a left part of the vehicle, and two cameras may be provided at a right part of the vehicle, but the numbers and the locations of the cameras are not limited thereto.

The sensor 110 may be configured in the form of a combination of the image sensor 105 and the radar sensor 104, or a combination of the image sensor 105 and the lidar sensor 103. Functions of the sensors may be intuitively inferred from their names by one of ordinary skill in the art, and thus detailed descriptions thereof will not be provided herein.

The processor 1110 may control driving of the vehicle based on information received from the plurality of sensors included in the sensor 110. The processor 1110 may control overall operations of the vehicle driving control apparatus 200. The processor 1110 may control the sensor 110, the communicator 1130, the outputter 150, the memory 1120, and the inputter 170 by executing programs stored in the memory 1120.

According to an embodiment of the disclosure, the processor 1110 may include an artificial intelligence (AI) processor and, in this case, the processor 1110 may determine a sensor requiring calibration, determine a driving route, or calibrate the sensor by using a trained network model of an AI system.

The AI processor may be produced in the form of a dedicated hardware chip for AI, or may be produced as a part of an existing general-use processor (e.g., a central processing unit (CPU) or an application processor) or a dedicated graphic processor (e.g., a graphics processing unit (GPU)) and be mounted in the vehicle driving control apparatus 200.

According to an embodiment of the disclosure, upon determining that calibration of a sensor is required, the processor 1110 may determine a driving route to include a calibration area, and calibrate the sensor based on values measured by the plurality of sensors while the vehicle is being driven along the driving route, and information about the calibration area.

The communicator 1130 may include one or more elements for communication between the vehicle and an external entity. For example, the communicator 1130 may include a short-range wireless communicator 131, a mobile communicator 132, and a broadcast receiver 133, but is not limited thereto.

The short-range wireless communicator 131 may include, for example, a Bluetooth communicator, a Bluetooth low energy (BLE) communicator, a near field communicator, a wireless local area network (WLAN) (or Wi-Fi) communicator, a Zigbee communicator, an infrared data association (IrDA) communicator, a Wi-Fi direct (WFD) communicator, an ultra-wideband (UWB) communicator, an Ant+ communicator, and a microwave (μWave) communicator, but is not limited thereto.

The communicator 1130 may transmit, to the navigation server 900, a signal indicating that calibration of a sensor is required and receive a driving route determined to include a calibration area from the navigation server 900 in response to the transmitted signal.

The driving mechanism 140 may include elements used to drive the vehicle and operate devices in the vehicle. The driving mechanism 140 may include at least one of a power supply 141, a propulsion system 142, a running gear system 143, or peripheral devices 144, but is not limited thereto.

The peripheral devices 144 may include a navigation system, lamps, direction indicators, windshield wipers, internal lighting, a heater, and an air-conditioner. The navigation system may be a system configured to determine a driving route of the vehicle. The navigation system may be configured to dynamically update the driving route while the vehicle is being driven. For example, the navigation system may use data collected by a GPS module to determine the driving route of the vehicle.

The outputter 150 may be used to output an audio signal, a video signal, or a vibration signal, and include, for example, a display 151, a sound outputter 152, and a vibration motor 153. The outputter 150 may output information processed by the vehicle driving control apparatus 200. For example, the outputter 150 may provide a UI for requesting permission of a user for repeated driving for calibration, or a UI for requesting permission of the user for additional driving for calibration.

The display 151 may display information processed by the vehicle driving control apparatus 200. For example, the display 151 may display a map including the driving route, display locations of external vehicles, display blind spots of drivers of the external vehicles, or display a current speed, a remaining amount of fuel, or information for guiding the driving route of the vehicle, but is not limited thereto.

When the display 151 and a touchpad are layered to configure a touchscreen, the display 151 may be used not only as an output device but also as an input device. The vehicle driving control apparatus 200 may include two or more displays 151 depending on implementation of the vehicle driving control apparatus 200.

The sound outputter 152 may output audio data received from the communicator 1130 or stored in the memory 1120. The sound outputter 152 may output a sound signal related to a function performed by the vehicle. For example, the sound outputter 152 may output a voice message for guiding the driving route of the vehicle, or a voice message for requesting permission of the user for repeated driving (or additional driving). The sound outputter 152 may include, for example, a speaker and a buzzer.

The vibration motor 153 may output a vibration signal. For example, the vibration motor 153 may output a vibration signal corresponding to output of audio or video data (e.g., a warning message).

The memory 1120 may store programs for processing and control operations of the processor 1110, and store input/output data. The memory 1120 may include at least one of flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, or an optical disc. The vehicle driving control apparatus 200 may use a web storage or a cloud server which performs a storage function on the Internet.

The inputter 170 refers to a means used by the user to input data for controlling the vehicle or the vehicle driving control apparatus 200. For example, the inputter 170 may include a keypad, a dome switch, a touchpad (e.g., a capacitive overlay, a resistive overlay, an infrared beam, a surface acoustic wave, an integral strain gauge, or a piezoelectric touchpad), a jog wheel, or a jog switch, but is not limited thereto.

The inputter 170 may receive an input of the user in response to the UI for requesting permission of the user for repeated driving (or additional driving) for calibration.

Figure 13:
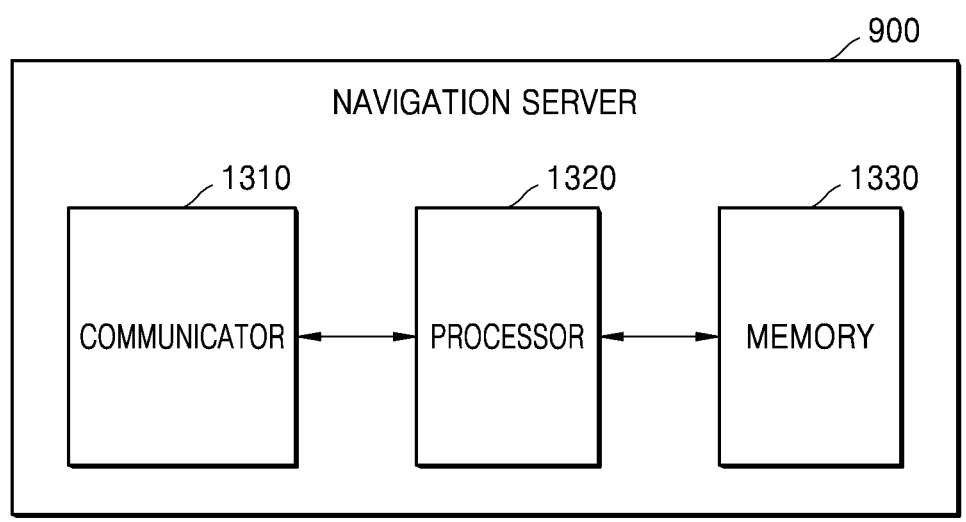
FIG. 13 is a block diagram of a navigation server according to an embodiment of the disclosure.

FIG. 13 is a block diagram of a navigation server according to an embodiment of the disclosure.

Referring to FIG. 13, the navigation server 900 may include a communicator 1310, a processor 1320, and a memory 1330. Although the navigation server 900 includes a single processor in FIG. 13, embodiments of the disclosure are not limited thereto and the navigation server 900 may include a plurality of processors. At least some of operations and functions of the processor 1320 described below may also be performed by a plurality of processors. The navigation server 900 illustrated in FIG. 13 may perform the method described above in relation to FIG. 10, and a repeated description will not be provided herein.

The processor 1320 controls overall operations of the navigation server 900. For example, the processor 1320 may control other elements included in the navigation server 900 (e.g., the communicator 1310 and the memory 1330), by executing a program stored in the navigation server 900.

The communicator 1310 may receive, from the vehicle driving control apparatus 200, a signal indicating that calibration of a sensor mounted in the vehicle is required. For example, the communicator 1310 may receive a signal indicating that calibration of a first sensor is required.

The processor 1320 may determine a driving route to include a predetermined area of road used to calibrate the first sensor, based on map data including information about an area of road used to calibrate each of a plurality of sensors.

For example, when calibration of a sensor for sensing a roll about the X axis or a yaw about the Z axis of the vehicle is required, the processor 1320 may determine the driving route to include a roundabout. When calibration of a sensor for sensing a pitch about the Y axis of the vehicle is required, the processor 1320 may determine the driving route to include a straight flat road.

The processor 1320 may determine the driving route including a calibration area in such a manner that the vehicle is driven by a distance greater than a driving distance along the shortest route to a destination by a threshold value or less.

The communicator 1310 may transmit the driving route and information about the predetermined area of road to the vehicle driving control apparatus 200.

The memory 1330 may store the map data including the information about the area of road used to calibrate each of the plurality of sensors. The area of road used to calibrate each of the plurality of sensors may include at least one of a roundabout or a straight flat road. The information about the area of road used to calibrate each of the plurality of sensors may include at least one of location information of the area of road or information about a shape of the area of road.

The communicator 1310 may receive, from the vehicle driving control apparatus 200, values measured by the sensors mounted in the vehicle while the vehicle is being driven along the driving route. The processor 1320 may update the map data based on the received measured values.

The afore-described embodiments of the disclosure may be implemented by a software program including instructions stored in a computer-readable storage medium.

The computer is a device capable of fetching instructions stored in the storage medium and operating according to the embodiments of the disclosure based on the fetched instructions. The computer may include an image transmission device and an image reception device according to the embodiments of the disclosure.

The computer-readable storage medium may be provided in the form of a non-transitory storage medium. When the storage medium is 'non-transitory', it means that the storage medium does not include signals and is tangible, and it does not limit that data is semi-permanently or temporarily stored in the storage medium.

An electronic device or a method according to the embodiments of the disclosure may be included and provided in a computer program product. The computer program product may be traded between a seller and a buyer.

The computer program product may include a software program, and a computer-readable storage medium storing the software program. For example, the computer program product may include a product (e.g., a downloadable application) that is electronically distributed in the form of a software program by a manufacturer of the electronic device or an electronic market (e.g., Google Play or App Store). For electronic distribution, at least a part of the software program may be stored in a storage medium or be temporarily created. In this case, the storage medium may be a server of the manufacturer, a server of the electronic market, or a storage medium of a relay server that temporarily stores the software program.

The computer program product may include a storage medium of a server or a storage medium of a device (e.g., a vehicle driving control apparatus or a navigation server) in a system including the server and the device. Otherwise, when a third device (e.g., a smartphone) connected to the server or the device is present, the computer program product may include a storage medium of the third device. Alternatively, the computer program product may include a software program itself transmitted from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an AI server) may execute the computer program product stored in the server, to control the device connected to the server, to perform the method according to the embodiments of the disclosure.

As another example, the third device may execute the computer program product to control the device connected to the third device, to perform the method according to the embodiments of the disclosure.

When the third device executes the computer program product, the third device may download the computer program product from the server and execute the downloaded computer program product. Alternatively, the third device may execute the computer program product provided in a preloaded state, to perform the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A vehicle driving control apparatus for controlling driving of a vehicle based on information received from a plurality of sensors, the vehicle driving control apparatus comprising:
   at least one processor configured to determine a driving route to comprise a predetermined area of road, upon determining that calibration of a first sensor is required, wherein the calibration is performed to calculate a correction value for converting a sensing value of the first sensor into a vehicle reference value by periodically comparing a sensor reference coordinate system of the first sensor and a vehicle reference coordinate system of the vehicle, and perform the calibration of the first sensor in the predetermined area of road; and
   a memory configured to store values measured by the plurality of sensors while the vehicle is being driven along the driving route,
   wherein the information about the predetermined area of the road used to calibrate each of the plurality of sensors includes information about a shape of the area of the road and accurate information for 6 degrees of freedom comprising x, y, z, roll, pitch, and yaw.

2. The vehicle driving control apparatus of claim 1, wherein the plurality of sensors are mounted in the vehicle and comprise at least one of an inertial measurement unit (IMU), a camera, a radar, a lidar, or a global positioning system (GPS).

3. The vehicle driving control apparatus of claim 2, wherein the at least one processor is further configured to determine whether the calibration of the first sensor is required by comparing a difference between three-dimensional (3D) point cloud data obtained from the lidar and 3D point cloud data obtained from an image captured by the camera.

4. The vehicle driving control apparatus of claim 3, wherein at least one processor is further configured to obtain 3D coordinate values of points by applying at least one of oriented features from accelerated segment test (FAST) and rotated binary robust independent elementary features (BRIEF) (ORB) or a scale-invariant feature transform (SIFT) to the image captured by the camera.

5. The vehicle driving control apparatus of claim 4, wherein the at least one processor is further configured to determine whether the calibration of the first sensor is required by:
   estimating first location and position variations of the vehicle based on variations of the 3D coordinate values according to time,
   estimating second location and position variations of the vehicle based on deceleration information and/or acceleration information obtained from the IMU, and
   comparing the estimated first and second location and position variations of the vehicle.

6. The vehicle driving control apparatus of claim 1, wherein the at least one processor is further configured to determine that the calibration of the first sensor is required, when a difference between the value measured by the first sensor and the values measured by the other sensors is greater than or equal to a threshold value.

7. The vehicle driving control apparatus of claim 1, wherein the predetermined area of road comprises at least one of a roundabout or a straight flat road,
   wherein the memory is further configured to store map data comprising information about an area of road used to calibrate each of the plurality of sensors, and
   wherein the at least one processor is further configured to determine the driving route to comprise the predetermined area of road used to calibrate the first sensor based on the map data.

8. The vehicle driving control apparatus of claim 7, wherein the at least one processor is further configured to update the map data based on the stored measured values.

9. The vehicle driving control apparatus of claim 1: wherein the at least one processor is further configured to:
   determine the driving route to comprise a roundabout when calibration of a sensor for sensing a roll about an X axis or a yaw about a Z axis of the vehicle is required, and
   determine the driving route to comprise a straight flat road when calibration of a sensor for sensing a pitch about a Y axis of the vehicle is required.

10. The vehicle driving control apparatus of claim 1, wherein the at least one processor is further configured to determine the driving route in such a manner that the vehicle is driven by a distance greater than a driving distance along a shortest route to a destination by a threshold value or less.

11. The vehicle driving control apparatus of claim 1, further comprising:
    an outputter configured to provide, to a user, a user interface (UI) for requesting permission of the user for repeated driving for calibration; and
    a user inputter configured to receive an input of the user in response to the UI,
    wherein the at least one processor is further configured to determine the driving route in such a manner that the vehicle is repeatedly driven through the predetermined area of road based on the input of the user.

12. The vehicle driving control apparatus of claim 1, further comprising:
    an outputter configured to provide, to a user, a user interface (UI) for requesting permission of the user for additional driving for calibration; and
    a user inputter configured to receive an input of the user in response to the UI,
    wherein the at least one processor is further configured to:
       control the vehicle to be additionally driven for calibration after driving intended by the user is terminated based on the input of the user,
       store, in the memory, values additionally measured by the plurality of sensors while the vehicle is being additionally driven, and
       calibrate the first sensor based on the stored measured values, the information about the predetermined area of road, and the additionally measured values.

13. The vehicle driving control apparatus of claim 1, wherein the memory is further configured to store map data comprising location information of the predetermined area of road used to calibrate each of the plurality of sensors, and
    wherein the at least one processor is further configured to:
       obtain, from the map data, information about the shape of the predetermined area of road as the information about the predetermined area of road,
       reconfigure the shape of the predetermined area of road based on the stored measured values,
       determine that the calibration of the first sensor is required based on whether an error between the reconfigured shape of the predetermined area of road and previously known information exceeds a threshold range, and
       calibrate the first sensor by comparing the reconfigured shape of the predetermined area of road with the shape of the predetermined area of road obtained from the map data.

14. The vehicle driving control apparatus of claim 1, wherein the memory further stores information about an error probability of each sensor, and
    wherein the at least one processor is further configured to determine that the calibration of the first sensor is required when an error probability of the first sensor is calculated to be greater than or equal to a threshold value.

15. The vehicle driving control apparatus of claim 1, wherein the memory further stores information about a calibration cycle for each sensor, and
    wherein the at least one processor is further configured to determine that the calibration of the first sensor is required when a certain time has passed after the first sensor was calibrated.

16. A calibration method performed by a vehicle driving control apparatus based on information received from a plurality of sensors, the calibration method comprising:
    determining that calibration of a first sensor is required, wherein the calibration is performed to calculate a correction value for converting a sensing value of the first sensor into a vehicle reference value by periodically comparing a sensor reference coordinate system of the first sensor and a vehicle reference coordinate system of the vehicle;
    determining a driving route to comprise a predetermined area of road;
    storing values measured by the plurality of sensors while a vehicle is being driven along the driving route; and calibrating the first sensor based on the stored measured values in the predetermined area of road,
wherein the information about the predetermined area of the road used to calibrate each of the plurality of sensors includes information about a shape of the area of the road and accurate information for 6 degrees of freedom comprising x, y, z, roll, pitch, and yaw.

17. A vehicle driving control apparatus for controlling driving of a vehicle based on information received from a plurality of sensors, the vehicle driving control apparatus comprising:
   a communicator comprising a transceiver and configured to:
      transmit a signal indicating that calibration of a first sensor is required, wherein the calibration is performed to calculate a correction value for converting a sensing value of the first sensor into a vehicle reference value by periodically comparing a sensor reference coordinate system of the first sensor and a vehicle reference coordinate system of the vehicle, and
      receive a driving route determined to comprise a predetermined area of road in response to the transmitted signal;
   a memory configured to store values measured by the plurality of sensors while the vehicle is being driven along the driving route; and
   at least one processor configured to calibrate the first sensor based on the stored measured values in the predetermined area of road,
   wherein the information about the predetermined area of the road used to calibrate each of the plurality of sensors includes information about a shape of the area of the road and accurate information for 6 degrees of freedom comprising x, y, z, roll, pitch, and yaw.

18. The vehicle driving control apparatus of claim 17, wherein the at least one processor is further configured to determine that the calibration of the first sensor is required, when a difference between the value measured by the first sensor and the values measured by the other sensors is greater than or equal to a threshold value.

19. The vehicle driving control apparatus of claim 17, further comprising:
   an outputter comprising at least one of a display, an audio speaker, or a vibration motor and configured to provide, to a user, a user interface (UI) for requesting permission of the user for repeated driving for calibration; and
   a user inputter comprising at least one of a keypad, a dome switch, a touchpad, a jog wheel, or a jog switch and configured to receive an input of the user in response to the UI,
   wherein the at least one processor is further configured to control the vehicle to be repeatedly driven through the predetermined area of road based on the input of the user.

20. The vehicle driving control apparatus of claim 17, further comprising:
   an outputter comprising at least one of a display, an audio speaker, or a vibration motor and configured to provide, to a user, a user interface (UI) for requesting permission of the user for additional driving for calibration; and
   a user inputter comprising at least one of a keypad, a dome switch, a touchpad, a jog wheel, or a jog switch and configured to receive an input of the user in response to the UI,
   wherein the at least one processor is further configured to:
      control the vehicle to be additionally driven for calibration after driving intended by the user is terminated,
      store, in the memory, values additionally measured by the plurality of sensors while the vehicle is being additionally driven, and
      calibrate the first sensor based on the stored measured values, the information about the predetermined area of road, and the additionally measured values.

21. The vehicle driving control apparatus of claim 17,
wherein the communicator is further configured to receive map data comprising the driving route, location information of the predetermined area of road, and
wherein the at least one processor is further configured to:
   obtain, from the map data, the information about the shape of the predetermined area of road as the information about the predetermined area of road,
   reconfigure the shape of the predetermined area of road based on the stored measured values,
   determine that the calibration of the first sensor is required based on whether an error between the reconfigured shape of the predetermined area of road and previously known information exceeds a threshold range, and
   calibrate the first sensor by comparing the reconfigured shape of the predetermined area of road with the shape of the predetermined area of road obtained from the map data.

22. A navigation server for providing a driving route to a vehicle driving control apparatus, the navigation server comprising:
   a communicator configured to receive, from the vehicle driving control apparatus, a signal indicating that calibration of a first sensor mounted in a vehicle is required, wherein the calibration is performed to calculate a correction value for converting a sensing value of the first sensor into a vehicle reference value by periodically comparing a sensor reference coordinate system of the first sensor and a vehicle reference coordinate system of the vehicle; and
   at least one processor configured to determine a driving route to comprise a predetermined area of road used to calibrate the first sensor based on map data comprising information about an area of road used to calibrate each of a plurality of sensors,
   wherein the communicator is further configured to transmit, to the vehicle driving control apparatus, the driving route and information about the predetermined area of road to calibrate the first sensor based on values measured by the plurality of sensors mounted in the vehicle in the predetermined area of road, and
   wherein the information about the predetermined area of the road used to calibrate each of the plurality of sensors includes information about a shape of the area of the road and accurate information for 6 degrees of freedom comprising x, y, z, roll, pitch, and yaw.

23. The navigation server of claim 22,
wherein the area of road used to calibrate each of the plurality of sensors comprises at least one of a roundabout or a straight flat road, and
wherein the information about the area of road used to calibrate each of the plurality of sensors comprises location information of the predetermined area of road.

24. The navigation server of claim 22,
wherein the communicator is further configured to receive, from the vehicle driving control apparatus, the values measured by the plurality of sensors mounted in the vehicle while the vehicle is being driven along the driving route,
wherein the at least one processor is further configured to update the map data based on the received measured values.

* * * * *